United States Patent Office 3,020,313
Patented Feb. 6, 1962

3,020,313
PROCESS FOR PREPARING PHENYL CARBAMYL CHLORIDES
Johnnie M. Aulbaugh, Baytown, Charles J. Kramis, Houston, and Howard T. Siefen, Pasadena, Tex., assignors to E. I. du Pont de Nemours and Company, Wilmington, Del., a corporation of Delaware
No Drawing. Filed Aug. 13, 1958, Ser. No. 754,732
4 Claims. (Cl. 260—544)

This invention relates to a process for the preparation of substituted phenyl carbamyl chlorides. More particularly, it relates to a process for reacting chlorine with an aromatic isocyanate under substantially anhydrous conditions.

The general reaction of phenyl isocyanate and chlorine to produce a mixture of ortho- and para-chlorophenyl carbamyl chlorides is known.

According to this invention, it has been found that yield increases of 25% and greater are obtained by reacting, in an inert organic solvent, approximately equal molar amounts of chlorine and phenyl isocyanate under substantially anhydrous conditions. By substantially anhydrous conditions is meant that no more than about 250, and preferably no more than about 100, parts per million of water are present during the reaction, based on the total weight of the solvent and the chlorine and phenyl isocyanate reactants.

While the general reaction has formerly been considered operable satisfactorily without critical control of the amount of water present, it has now unexpectedly been found that eliminating the amount of water present to the extent required according to this invention effects an improvement in product quality and a remarkable increase in product yield.

It will be noted that the maximum amount of water (parts per million) tolerable in the process according to this invention is very small. The reason why such greatly improved yields are obtainable when water is excluded in the substantially anhydrous process is not fully understood, but it appears that the presence of even small amounts of $H_2O$ act to inhibit or poison the reaction to a unpredictable degree. Thus a plotted graph of product yield versus amount of $H_2O$ present shows a high yield under substantially anhydrous conditions and a sharp drop of the curve to indicate a drop in yield of some 20 or 25% and more as the amount of $H_2O$ present is increased up to about 250 parts per million by weight.

The inert organic carrier solvent employed can be varied widely and can be aliphatic or aromatic. By inert is meant that the solvent is not significantly reactive with chlorine or the phenyl isocyanate. For practical purposes, the solvent is one that boils above about 75° C. Suitable aliphatic solvents include acetylene tetrachloride, chloroform, carbon tetrachloride, hexachloroethane, and the like. Suitable other solvents include, for example, chlorinated aromatic hydrocarbons such as monochlorobenzene, ortho-dichlorobenzene, trichlorobenzene, monochlorotoluenes, and other substituted aromatic hydrocarbons such as nitrobenzene. Monochlorobenzene is the preferred solvent.

The reaction can be catalyzed, if desired, by the presence of a suitable chlorination reaction catalyst, such as iodine, ferric chloride, antimony trichloride, antimony pentachloride, stannic chloride, etc.

While the reaction can be carried out over a broad range of temperature conditions, for example, from −15° or lower to about 90° C., significant advantages in product yield and quality are obtained when the process of this invention is carried out at temperatures below about 30° C., and preferably within the range from −15° C. to 15° C.

The process of this invention can be carried out in any suitable reaction vessel, and the reactants admixed in either order. For example, the phenyl isocyanate in solution in a suitable inert organic solvent can be treated, combined or admixed with the desired amount of chlorine by bubbling through the solution gaseous chlorine in the amount desired, taking precautions to exclude the presence of water as required according to this invention. Alternatively, the isocyanate in solution can be made to effect contact with a flowing stream of chlorine gas.

In another illustrative process arrangement, this invention can be carried out in a two-step (or more) process wherein a portion of the theoretical amount of chlorine, such as from 80% to 98%, required to react with all of the phenyl isocyanate is combined with the phenyl isocyanate in suitable solution in a first stage, a portion of the output from the first stage is recycled back into the first stage preferably in an amount to provide at least half as much unchlorinated phenyl isocyanate as is initially introduced into the first reaction stage, and a second portion of the material leaving the first reaction stage is drawn off and combined with additional chlorine in an amount, such as from about 2% to 20%, sufficient to provide the additional theoretical amount of chlorine required to react with all of the phenyl isocyanate, in order to complete the chlorination. This process also should be carried out under substantially anhydrous conditions.

Careful selection of all anhydrous reactant materials and the use of sealed vessels and conduits is a convenient way for assuring that substantially anhydrous conditions will be used.

The product, parachlorophenyl carbamyl chloride, can of course, if desired, be converted dehydrohalogenation, with the evolution of hydrogen chloride, to form parachlorophenyl isocyanate, which in turn can be aminated by known processes to make highly useful substituted phenyl urea herbicides.

In a preferred method for maintaining the substantially anhydrous conditions for the process according to this invention, the entire process is carried out under a pressure slightly greater than atmospheric, such as on the order of 1 to 10 inches of water pressure, and preferably from 2 to 5 inches of pressure. Lower and higher pressures can of course be used, such as on the order of 1 to 5 atmospheres.

The process can of course be continuous or batch.

In order that the invention may be better understood, the following examples are given in addition to those already set forth above:

Example 1

Phenyl isocyanate is a concentration of about 14% by weight in solution in monochlorobenzene is made to react with chlorine by bubbling gaseous chlorine in a theoretical amount through the solution while maintaining the temperature of the reaction mass at about 40° C. The reaction is carried out in a sealed vessel while maintaining less than about 20 parts per million of water based on the total weight of the monochlorobenzene and the chlorine and phenyl isocyanate reactants are present during the reaction. A yield of 74.5% of parachlorophenyl carbamyl chloride is obtained in the monochlorobenzene solvent solution.

Example 2

This example illustrates the surprising increase in yield obtainable by carrying out the process of chlorination of phenyl isocyanate under substantially anhydrous conditions according to this invention.

In two separate processes, gaseous chlorine is combined with 225 milliliters of phenyl isocyanate in solution in 1804 grams of monochlorobenzene, using 2.165 grams of iodine as a catalyst, at a temperature of about 5° C. maintained throughout the reaction, the chlorine to phenyl isocyanate mole ratio being 1:05. In the first process, carried out according to this invention under carefully controlled conditions such that about 25 parts per million by weight of water are present, analysis of the parachlorophenyl carbamyl chloride reaction product shows a yield of about 74.8%. By comparison, in the second process, carried out under conditions wherein an amount of water is present of about 500 parts per million by weight, a yield of parachlorophenyl carbamyl chloride of less than 50% is obtained.

Example 2 is repeated in the following examples, with similar results, using the indicated organic solvent as the reaction medium in place of monochlorobenzene.

*Example 3*

Ortho-dichlorobenzene.

*Example 4*

Carbontetrachloride.

*Example 5*

Para-chlorotoluene.

*Example 6*

Acetylene tetrachloride.

*Example 7*

Into a temperature controlled jacketed vessel, maintained at a temperature of 10° to 15° C. by a coolant circulating in the jacket, is pumped a 14% solution in monochlorobenzene of phenyl isocyanate and about 0.2% by weight iodine catalyst. Simultaneously, 92% of the theoretical amount of chlorine required to react with the phenyl isocyanate is pumped also into the same packeted vessel. All components are moved through the vessel at a velocity of 9–11 feet/second.

The reactants and solvent medium are maintained substantially anhydrous and the entire apparatus maintained under a pressure of about 2 inches of water, preventing the admittance of more than about 50 parts per million by weight of water into the reaction mass.

A portion of the material leaving the jacketed vessel is recycled back into the vessel in an amount that provides unreacted phenyl isocyanate in the recycled portion equal to 60% of the amount of phenyl isocyanate initially fed into the vessel.

A second portion of chlorinated material leaving the jacketed vessel is continuously drawn off and combined with additional chlorine in an amount of 8% of theoretical. The resultant product is analyzed as a 74.1% yield of relatively pure para-chlorophenyl carbamyl chloride.

It will of course be understood by persons in the art that the above examples can be repeated by substituting other solvents, temperatures and process conditions for those given in the above examples, as long as the processes are carried out under substantially anhydrous conditions as taught and defined herein.

The invention claimed is:

1. In the process of reacting approximately equimolar amounts of phenyl isocyanate and chlorine, at a temperature within the range from −15° to 90° C., in a solvent selected from the group consisting of acetylene tetrachloride, chloroform, carbon tetrachloride, hexachloroethane, monochlorobenzene, ortho-dichlorobenzene, trichlorobenzene, monochlorotoluenes and nitrobenzene, to produce para-chlorophenyl carbamyl chloride, the improvement of carrying out said process in the presence of less than 250 parts per million by weight of water.

2. The process as set forth in claim 1 wherein said process is carried out at a temperature between about −15° C. and 30° C.

3. The process as set forth in claim 1 wherein said solvent is monochlorobenzene.

4. The process as set forth in claim 1 wherein said process is carried out in the presence of less than 100 parts per million by weight of water.

References Cited in the file of this patent

Gumpert: J. Pract. Chem. [2] 32, 294–297 (1885).